United States Patent
Zhou et al.

(10) Patent No.: US 9,952,928 B1
(45) Date of Patent: *Apr. 24, 2018

(54) OPERATION AWARE STRIPING IN PARALLEL DRIVES

(71) Applicant: Marvell International Ltd., Hamilton (BM)

(72) Inventors: Wei Zhou, San Jose, CA (US); Chee Hoe Chu, San Jose, CA (US); Po-Chien Chang, Saratoga, CA (US)

(73) Assignee: Marvell International Ltd., Hamilton (BM)

( * ) Notice: Subject to any disclaimer, the term of this patent is extended or adjusted under 35 U.S.C. 154(b) by 48 days.

This patent is subject to a terminal disclaimer.

(21) Appl. No.: 15/068,500

(22) Filed: Mar. 11, 2016

Related U.S. Application Data

(63) Continuation of application No. 12/403,192, filed on Mar. 12, 2009, now Pat. No. 9,286,202.

(60) Provisional application No. 61/075,959, filed on Jun. 26, 2008.

(51) Int. Cl.
  *G06F 12/02* (2006.01)
  *G06F 11/10* (2006.01)

(52) U.S. Cl.
  CPC ...... *G06F 11/1088* (2013.01); *G06F 12/0246* (2013.01); *G06F 2212/7211* (2013.01)

(58) Field of Classification Search
  CPC ............... G06F 12/0246; G06F 3/0679; G06F 2212/7211; G06F 3/0688; G06F 2212/7202; G06F 2212/2022; G06F 2212/222; G06F 12/00; G06F 12/0238
  USPC ....................................................... 711/103
  See application file for complete search history.

(56) References Cited

U.S. PATENT DOCUMENTS 7,865,761 B1  1/2011  Chilton

*Primary Examiner* — Jasmine Song

(57) ABSTRACT

Embodiments of the present invention provide a method comprising performing an operation on a first flash drive of a plurality of flash drives configured in a parallel flash drive architecture, wherein the operation occupies a flash controller corresponding to the first flash drive, sending a signal to a processor coupled with the parallel flash drive architecture to indicate that the flash controller is occupied, and writing data to two or more of the plurality of flash drives, other than the first flash drive, by striping the data amongst the two or more of the plurality of flash drives in response to the signal to the processor. Other embodiments may be described and/or claimed.

20 Claims, 4 Drawing Sheets

OPERATION AWARE STRIPING IN PARALLEL DRIVES

CROSS REFERENCE TO RELATED APPLICATIONS

The present disclosure is a continuation of and claims priority to U.S. patent application Ser. No. 12/403,192, filed Mar. 12, 2009, now U.S. Pat. No. 9,286,202, issued Mar. 15, 2016, which claims priority to U.S. Provisional Patent Application No. 61/075,959, filed Jun. 26, 2008, which are incorporated herein by reference.

TECHNICAL FIELD

Embodiments of the present invention relate to the field of storage devices, and more particularly, to read/write techniques and associated architecture of non-volatile memory.

BACKGROUND

Generally, a service life of erasable storage media such as flash memory is at least dependent on a number of erase and/or write operations performed on segments of the erasable storage media. Wear leveling is a technique that may be used to prolong the service life of the erasable storage media. For example, wear leveling may include arranging data such that read, write, or erase operations are more evenly distributed across the segments of the erasable storage media.

Such read, write, and/or erase operations may occupy one or more controllers or processors coupled with the erasable storage media such that additional operations to be performed on the erasable storage media are delayed. Techniques to overcome such delays are desirable to at least increase the speed of read, write, or erase operations in the erasable storage media.

SUMMARY

The present invention provides a method comprising performing an operation on a first flash drive of a plurality of flash drives configured in a parallel flash drive architecture, wherein the operation occupies a flash controller corresponding to the first flash drive, sending a signal to a processor coupled with the parallel flash drive architecture to indicate that the flash controller is occupied, and writing data to two or more of the plurality of flash drives, other than the first flash drive, by striping the data amongst the two or more of the plurality of flash drives in response to the signal to the processor.

In accordance with various embodiments, the operation includes at least one of a read, write, erase, and wear leveling operation.

In accordance with various embodiments, writing data to two or more of the plurality of flash drives is performed by the processor via one or more flash controllers corresponding to the two or more of the plurality of flash drives.

In accordance with various embodiments, striping the data comprises writing one or more data blocks of the data to each of the two or more of the plurality of flash drives until the data has been written to the two or more of the plurality of flash drives.

The present invention also provides an apparatus comprising a processor, a plurality of flash controllers arranged in parallel and configured to send a signal to the processor to indicate that one or more of the plurality of flash controllers are in an occupied state, and a plurality of flash drives corresponding to the plurality of flash controllers, wherein the processor is configured to write data to the plurality of flash drives by striping the data across the plurality of flash drives and skipping one or more of the plurality of flash drives that are coupled to the one or more flash controllers in the occupied state.

In accordance with various embodiments, read, write, erase, or wear leveling operations create the occupied state of the one or more flash controllers.

In accordance with various embodiments, the processor is configured to stripe the data across the plurality of flash drives by writing one or more data blocks of the data to each of the plurality of flash drives except the one or more of the plurality of flash drives that are coupled to the one or more flash controllers in the occupied state, until the data has been written to the flash drives.

In accordance with various embodiments, the processor is further configured to write out parity data of the data to allow reconstruction of the data.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

Embodiments of the present invention may describe wear leveling aware data striping and associated techniques and configurations. In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

The description may use perspective-based descriptions such as up/down, back/front, and top/bottom. Such descriptions are merely used to facilitate the discussion and are not intended to restrict the application of embodiments of the present invention.

For the purposes of the present invention, the phrase "A/B" means A or B. For the purposes of the present invention, the phrase "A and/or B" means "(A), (B), or (A and B)." For the purposes of the present invention, the phrase "at least one of A, B, and C" means "(A), (B), (C), (A and B), (A and C), (B and C), or (A, B and C)."

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Figure 1:
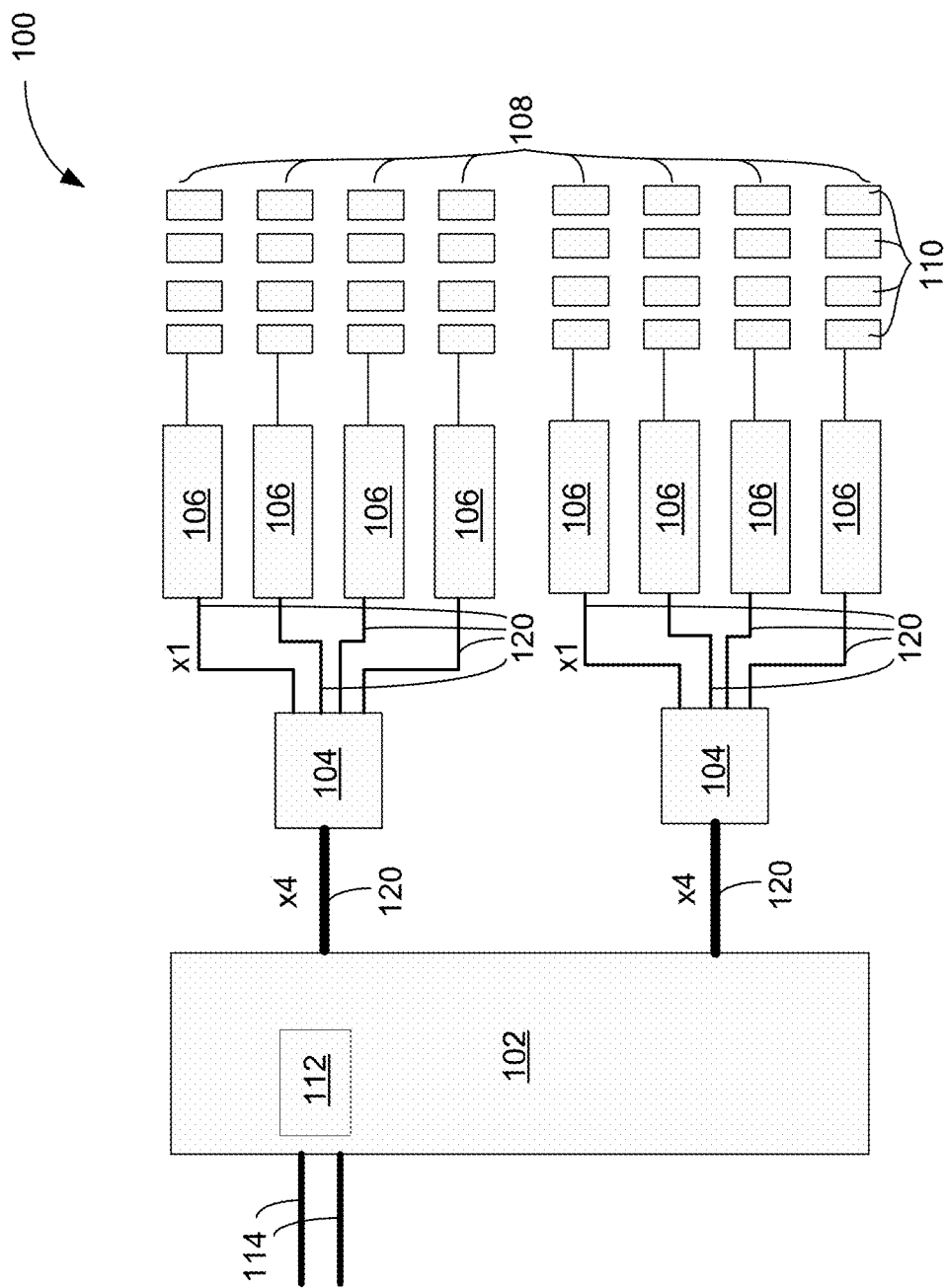
FIG. 1 is a schematic diagram of a parallel drive architecture, in accordance with various embodiments of the present invention.

FIG. 1 is a schematic diagram of a parallel drive architecture, in accordance with various embodiments of the present invention. In an embodiment, parallel drive architecture 100 includes an input/output (I/O) processor 102, one or more switches 104, one or more controllers 106, and one or more storage devices 108, coupled as shown. The one or more storage devices 108 may include one or more erasable segments 110. The parallel drive architecture 100 may further include serial attached small-computer-system-interface (SCSI) target mode functionality 112, which may be referred to as SAS target mode functionality 112, and SAS connections 114.

I/O processor 102 may be a host processor of a computing device in one embodiment. I/O processor 102 may include SAS target mode functionality 112 or Serial Advanced Technology Attachment (SATA) target mode functionality, referred to as SATA target mode functionality 112. I/O processor 102 may further include one or more SAS or SATA connections 114. SAS or SATA connections 114 may couple the I/O processor 102 with other electronic devices such as, for example, servers, or personal computers, or combinations thereof.

I/O processor 102 may be configured to perform one or more operations on one or more storage devices 108. In an embodiment, I/O processor 102 is configured to perform read, write and/or erase operations on the one or more storage devices 108. For example, I/O processor 102 may send data to be written to one or more controllers 106 coupled with the I/O processor 102. The one or more controllers 106 may be flash controllers. The one or more controllers 106 may comprise one or more processors disposed therein to execute instructions of the I/O processor 102. In an embodiment, the one or more controllers 106 are coupled in parallel to one another to simultaneously perform operations on the one or more storage devices 108 to increase throughput or speed of the operations such as read, write and/or erase. Although parallel drive architecture 100 depicts one controller 106 per storage device 108, other embodiments may include two or more controllers 106 per storage device 108.

I/O processor 102 may be coupled to the one or more controllers 106 using one or more switches 104. The one or more switches 104 may comprise one or more peripheral component interconnect (PCI) switches coupled with the multiple controllers 106 and the I/O processor 102 as depicted. The one or more switches 104 may comprise PCI express (PCI-Express) switches in an embodiment. Subject matter is not limited in this regard and one or more switches 104 may comprise other types of configurations in other embodiments.

The one or more switches 104 may be coupled with the I/O processor 102 and the one or more controllers 106 using one or more lanes 120. Lanes 120 may include a pair of bi-directional, point-to-point serial links. Lanes 120 may be represented by the conventional x prefix to indicate the number of lanes. For example, four lanes 120 may be represented by x4, eight lanes 120 may be represented by x8, and so forth. In the embodiment depicted in parallel drive architecture 100, four lanes (x4) 120 may couple switch 104 with the I/O processor 102 and one lane (x1) 120 per controller 106 may couple the one or more controllers 106 with the one or more switches 104. Subject matter is not limited in this regard and more or less lanes 120 may be used to couple controllers 106, switches 104, and I/O processor 102 in other embodiments.

One or more storage devices 108 may include one or more drives in an embodiment. Operations may be performed on the one or more drives 108 in parallel as a result of the parallel configuration used to couple the one or more drives 108 with the I/O processor 102 via the one or more controllers 106. One or more storage devices 108 may include one or more erasable segments 110. In an embodiment, the one or more erasable segments 110 include one or more blocks of flash memory.

Figure 2:
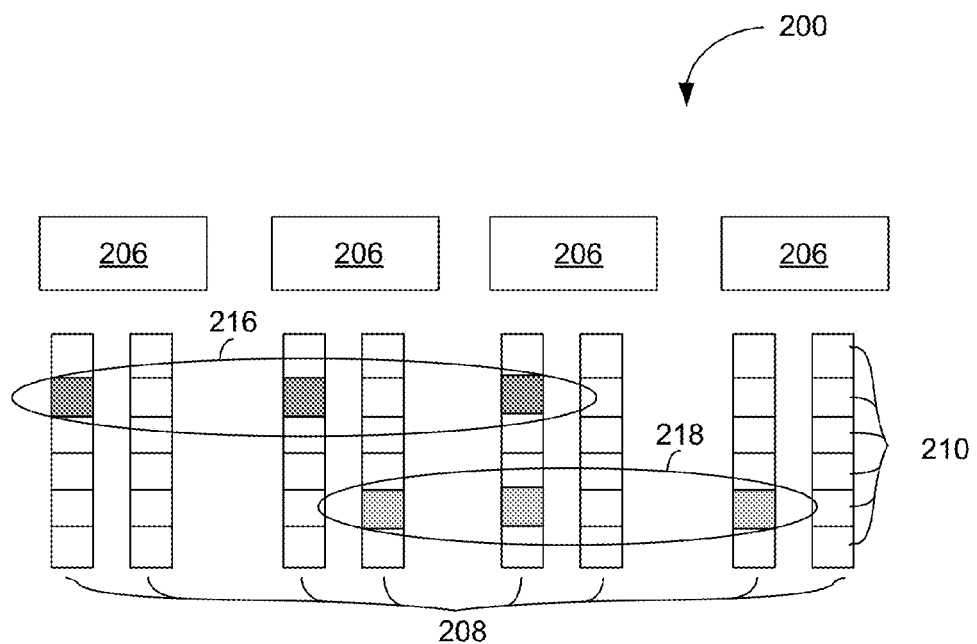
FIG. 2 is a schematic diagram of a data striping technique, in accordance with various embodiments of the present invention.
Figure 3:
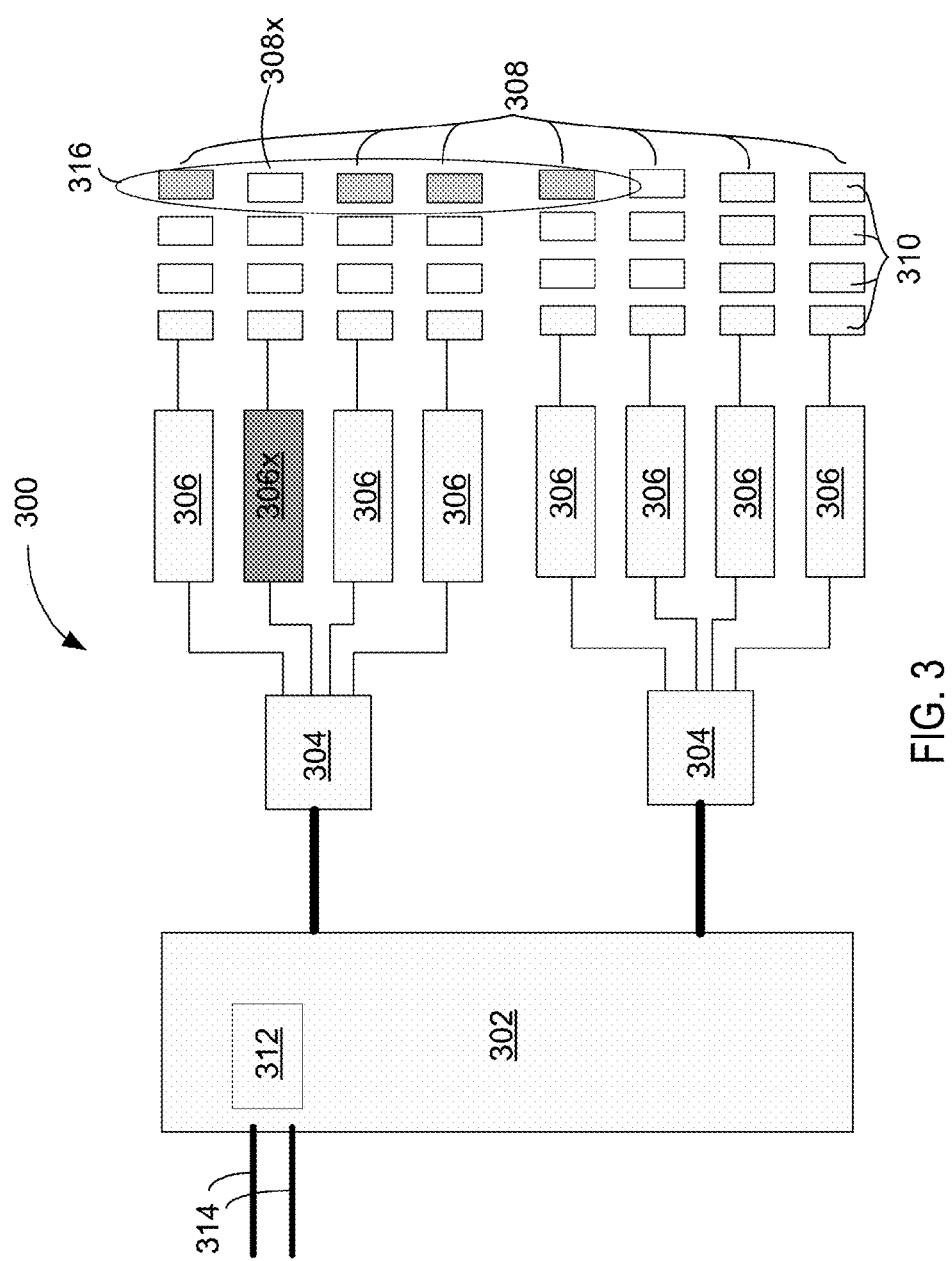
FIG. 3 is a schematic diagram that further illustrates a data striping technique, in accordance with various embodiments of the present invention.
Figure 4:
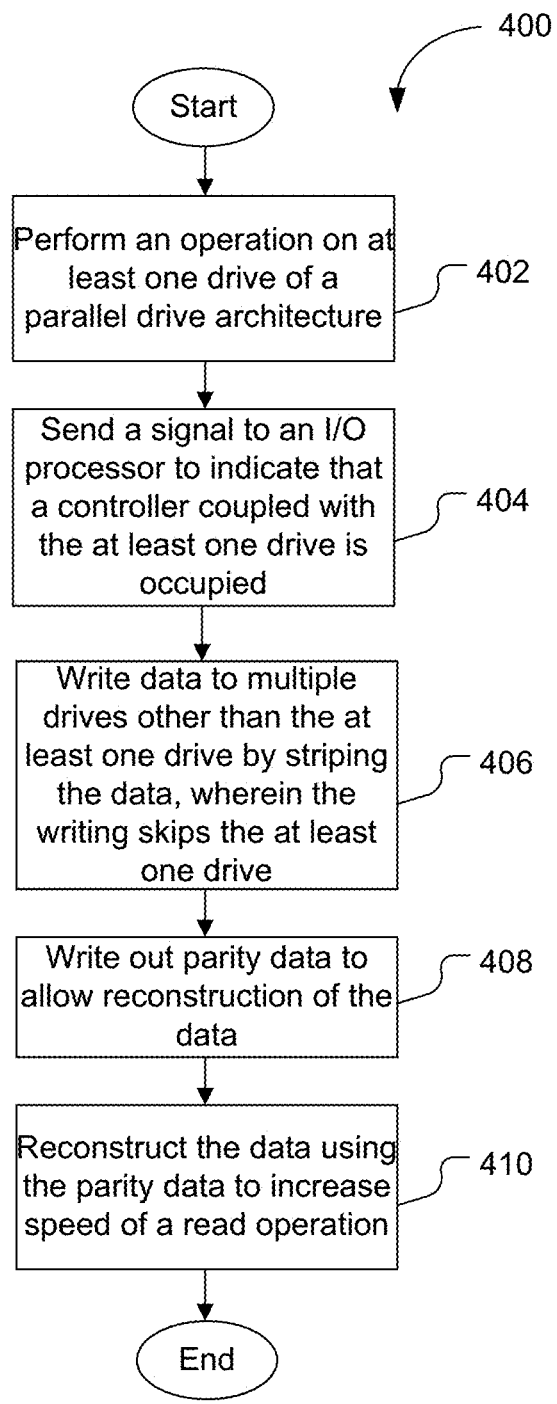
FIG. 4 is a process flow diagram of a method for operation aware data striping, in accordance with various embodiments of the present invention.

Parallel drive architecture 100 may accord with various embodiments including wear leveling, data striping, and/or data reconstruction techniques described further with respect to FIGS. 2-4.

FIG. 2 is a schematic diagram of a data striping technique, in accordance with various embodiments of the present invention. In an embodiment, data striping configuration 200 comprises one or more storage devices 208 having one or more erasable segments 210 coupled with one or more controllers 206, as shown. One or more storage devices and controllers 206 may be coupled with an I/O processor (not shown) in a parallel drive architecture 100 as described with respect to FIG. 1.

In an embodiment, erasable segments 210 that are shaded within group 216 and group 218 represent one or more blocks that have been written with data using a data striping technique. Data striping as depicted in groups 216 and 218 may include the segmentation and assignment of logically sequential data, such as a single data file, to multiple flash storage devices 208. Data striping may increase, for example, the read or write speed of a system using parallel drive architecture 100. In an embodiment, shaded blocks of group 216 represent a first data file stored across multiple flash devices 208 using a data striping technique. Shaded blocks of group 218 may represent a second data file stored across multiple flash devices 208 using a data striping technique. Such data striping of groups 216 and 218 may accord with embodiments described further with respect to FIGS. 3-4.

FIG. 3 is a schematic diagram that further illustrates a data striping technique, in accordance with various embodiments of the present invention. In an embodiment, parallel drive architecture 300 includes an input/output (I/O) processor 302, one or more switches 304, one or more controllers 306, and one or more storage devices 308 having one or more erasable segments 310, coupled as shown. The parallel drive architecture 300 may further include SAS or SATA target mode functionality 312, and SAS or SATA connections 314. Parallel drive architecture 300 may accord with embodiments described with respect to FIGS. 1-2, and 4. For example, controller(s) 306 and storage device(s) 306 may respectively include flash controller(s) and flash drive(s).

In an embodiment, one or more operations may be performed on at least one drive 108 configured in the parallel drive architecture 300, wherein the one or more operations occupy a controller 306 coupled with the at least one drive 306. A controller 306 may be in an "occupied" state when, for example, performing read, write, and/or erase operations. Controllers 306 may further be configured to perform wear leveling. Wear leveling may include, for example, a process to prolong a service life of one or more erasable segments 310 of one or more drives 308. In an embodiment, wear leveling includes arranging data of one or more drives 308 such that read, write, or erase operations are more evenly distributed across the one or more erasable segments 310 of the one or more drives 308. One or more controllers 306 may be in an "occupied" state when performing wear leveling. For example, wear leveling may decrease throughput of a controller 306 to about 10% of a throughput when a controller 306 is not performing wear leveling. Subject matter is not limited in this regard and an "occupied" state may have more or less impact to throughput of a controller 306 in other embodiments.

In an embodiment according to FIG. 3, one of the multiple controllers 306 has been shaded to indicate that the particular controller is in an "occupied" state, hereinafter referred to as the occupied controller 306x. The occupied controller 306x may be coupled to at least one drive 308x upon which one or more operations may be performed. Multiple controllers 306 may be each configured to send a signal to the I/O processor 302 to indicate that one or more of the multiple controllers 306 are in an "occupied" state. The signal(s) may include, for example, an interrupt signal, a data packet, or strobe signal, or combinations thereof. Other signals may be used in other embodiments. In an embodiment, the "occupied" or "unoccupied state" of the controllers 306 is stored by I/O processor 302 in a reference table.

In an embodiment, I/O processor 302 is configured to write data to multiple drives 308 by striping the data across the multiple drives 308. I/O processor 302 may be further configured to skip, during data striping, one or more drives 308x that are coupled to the one or more occupied controllers 306x. I/O processor 302 may, for example, skip a controller 306x that sends a signal to the I/O processor 302 to indicate that it is in the occupied state.

In an embodiment according to FIG. 3, group 316 of erasable segments 310 represents data striping type storage across multiple drives 308. The erasable segments of group 316 that are shaded may represent blocks upon which data is stored according to a data striping technique, while the erasable segment of group 316 that is not shaded may represent a block that is skipped by the I/O processor 302 during a data striping operation because the associated controller (shaded) 306x is in an occupied state.

Such a technique to signal the I/O processor 302 that a controller 306x is occupied and to skip the occupied controller 306x during data striping may overcome delays associated, for example, with wear leveling or other time occupying read, write, and/or erase operations. In an embodiment, the I/O processor 302 configured to process information according to such technique provides a write speed of a parallel drive architecture 300 substantially similar to a write speed of a parallel drive architecture that is not configured to perform wear leveling or that is not performing wear leveling. Such a technique may provide wear leveling aware data striping in parallel drive architecture 300.

In an embodiment, the I/O processor 302 is configured to stripe data across multiple drives 308 by sending data to be written to one or more controllers 306 that are not in the occupied state. The I/O processor 302 may be further configured to stripe data across multiple drives 308 by writing a data block of the data to each of the multiple drives 308 except one or more of the multiple drives 308 that are coupled to the one or more occupied controllers 306x, until the data has been written to the multiple drives 308.

I/O processor 302 may be configured to write out parity data of data to be stored on the one or more drives 308. Writing out parity data may allow reconstruction of the data to increase read speed. Reconstructing the data using parity data may be accomplished by well-known techniques. In an embodiment, the I/O processor 302 is further configured to write out the parity data to a controller that is different than a controller used for writing the data.

I/O processor 302 may be configured to read data stored or written by data striping on the multiple drives 308 and further configured to reconstruct the stored or written data using the parity data if one of the multiple drives 308 having the stored data is coupled with an occupied controller. Reconstructing the data using the parity data may be faster, for example, than waiting for the occupied controller to become unoccupied to retrieve the data.

In an embodiment, I/O processor 302 is configured to reference a table of the occupied state(s) of the one or more controllers 306 to determine whether to reconstruct the stored data using the parity data. For example, the I/O processor 302 may determine that one or more block(s) of data to be read is located in a drive that is coupled to an occupied controller. The I/O processor 302 may retrieve blocks of data from selective drives 308 coupled with other unoccupied controllers 306 except the drive coupled to the occupied controller(s), and may further reconstruct the block(s) of data stored on the drive(s) coupled to the occupied controller(s) 306 using parity data stored to one or more controller(s) other than the occupied controller(s) 306. In an embodiment, the I/O processor 302 is configured to reconstruct data for a read operation when a controller 306 is occupied due to performing wear leveling. Such read operation may be wear leveling aware and may increase throughput of read operations in parallel drive architecture 300.

FIG. 4 is a process flow diagram of a method 400 for operation aware data striping, in accordance with various embodiments of the present invention. In an embodiment, method 400 includes performing an operation on one or more drive(s) of a parallel drive architecture, at block 402, where the one or more drives are hereinafter referred to as "occupied drive(s)". Performing the operation on the occupied drive(s) 402 may include performing a read, write, erase, or wear leveling operation, or combinations thereof.

Performing wear leveling may include implementing a process to prolong a service life of one or more erasable segments of the occupied drive(s). Performing wear leveling may further include arranging data of the occupied drive(s) such that read, write, or erase operations are more evenly distributed across the one or more erasable segments of the occupied drive(s). Wear leveling may be controlled and performed by the controller coupled to the occupied drive(s).

Method 400 may further include sending a signal to an input/output (I/O) processor to indicate that the controller coupled with the occupied drive(s) is occupied, at block 404. Sending the signal to the I/O processor may include sending an interrupt signal, data packet, or strobe signal, or combinations thereof. Subject matter is not limited in this regard and other signals may be used to indicate that the controller coupled with the occupied drive(s) is occupied in other embodiments.

Sending the signal to the I/O processor may be performed by the controller coupled to occupied drive(s). In an embodiment, sending the signal to the I/O processor is performed via a peripheral component interconnect (PCI) switch coupled with the I/O processor. PCI switch may accord with other embodiments described with respect to FIGS. 1-3. For example, PCI switch may be a PCI-Express switch in various embodiments.

Method 400 may further include writing data to multiple drives of the parallel drive architecture other than the occupied drive(s) by striping the data, wherein the writing skips the occupied drive(s) that is coupled to the occupied controller in response to the signal to the I/O processor, at block 406. Such writing that skips the occupied drive(s) that is coupled to the occupied controller may provide benefits to throughput of the parallel drive architecture. For example, throughput for a parallel drive architecture that writes data according to techniques described herein may be substantially similar to a throughput of the parallel drive architecture that is not performing wear leveling at all. Writing the data to the multiple drives other than the occupied drive(s) by striping the data may be performed by the I/O processor via one or more corresponding controllers.

Striping the data may include sending data to be written to one or more unoccupied controllers coupled with the multiple drives other than the occupied drive(s). The one or more controllers may be unoccupied if they are not performing an operation on their corresponding drives. In an embodiment, the one or more controllers may be unoccupied if they do not send a signal to the I/O processor to indicate an occupied state. Striping the data may include writing one or more data block(s) of the data to each drive of the multiple drives other than the occupied drive(s) until the data has been written to the multiple drives.

Method 400 may further include writing out parity data of the data to allow reconstruction of the data, at block 408, in the event that one or more controllers coupled with the multiple drives become occupied. Writing out the parity data may include writing out parity data to a controller that is different than a controller used for writing the data.

Method 400 may further include creating and/or maintaining a table of state information of the one or more controllers coupled with the multiple drives and referencing the table using the I/O processor to determine the occupied or unoccupied state of the one or more controllers. For example, an unoccupied state may be deduced for a controller if it is not listed in a table of an occupied state. Method 400 may further include reading data written to the multiple drives coupled with controllers having the unoccupied state. Reading the data may be performed by I/O processor via the one or more controllers.

Method 400 may provide reconstructing the data using the parity data, at block 410. Reconstructing the data using parity data may be performed, for example, to increase the speed of a read operation. In an embodiment, reconstructing the data using the parity data occurs if the drive from which the data is to be read is coupled to a controller having the occupied state. Reconstructing the data using the parity data may be accomplished by well-known methods. Such reconstruction of the data may increase the speed of read operations in the parallel drive architecture. Reconstructing the data may be performed by I/O processor via the one or more controllers.

In an embodiment, an article of manufacture is disclosed. The article of manufacture may include a storage medium or other computer-readable medium having instructions stored thereon that, if executed, result in the actions described above in connection with FIG. 4.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted in additional embodiments.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments illustrated and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method of writing data to a plurality of flash drives configured in a parallel flash drive architecture, the method comprising:
    performing an operation on a first flash drive of the plurality of flash drives, wherein the operation occupies a first flash controller corresponding to the first flash drive; and
    in response to a signal indicating that the first flash controller will be occupied while the operation is performed,
        (i) refraining from writing data to the first flash drive, and
        (ii) writing the data to two or more of the plurality of flash drives by striping the data amongst the two or more of the plurality of flash drives.

2. The method of claim 1, wherein the signal comprises one of (i) an interrupt signal, (ii) a data packet or (iii) a strobe signal.

3. The method of claim 1, wherein writing data to two or more of the plurality of flash drives is performed via two or more flash controllers corresponding to the two or more of the plurality of flash drives.

4. The method of claim 1, wherein striping the data comprises writing one or more data blocks of the data to each of the two or more of the plurality of flash drives until the data has been written to the two or more of the plurality of flash drives.

5. The method of claim 1, further comprising:
    writing parity data of the data to allow reconstruction of the data in the event that one or more flash controllers corresponding to one or more of the plurality of flash drives become occupied.

6. The method of claim 5, further comprising:
    maintaining a table of state information with respect to the one or more flash controllers.

7. The method of claim 1, wherein the operation comprises at least one of (i) a read operation, (ii) a write operation, (iii) an erase operation, (iv) a wear leveling operation.

8. An apparatus comprising:
    a processor;
    a plurality of flash controllers arranged in parallel, wherein the plurality of flash controllers comprises a first flash controller; and a plurality of flash drives corresponding to the plurality of flash controllers, wherein the plurality of flash drives comprises a first flash drive that is controlled by the first flash controller, and wherein the first flash controller is in an occupied state in response to an operation being performed on the first flash drive, wherein the processor is configured to, in response to a signal indicating that the first flash controller is to be occupied while the operation is performed
(i) refrain from writing data to the first flash drive, and
(ii) write the data to two or more of the plurality of flash drives by striping the data across the two or more of plurality of flash drives.

9. The apparatus of claim 8, wherein the first flash controller is configured to generate and send the signal, and wherein the signal comprises one of (i) an interrupt signal, (ii) a data packet, or (iii) a strobe signal.

10. The apparatus of claim 8, wherein the processor is configured to stripe the data across the plurality of flash drives by writing one or more data blocks of the data to two or more of the plurality of flash drives.

11. The apparatus of claim 8, wherein the processor is further configured to write out parity data of the data to allow reconstruction of the data.

12. The apparatus of claim 11, wherein the processor is further configured to write out the parity data to a flash drive that is different than the two or more of plurality of flash drives used for writing the data.

13. The apparatus of claim 8, wherein the first operation comprises at least one of (i) a read operation, (ii) a write operation, (iii) an erase operation, (iv) a wear leveling operation.

14. A method comprising:
performing a first operation on a first flash drive of a plurality of flash drives configured in a parallel flash drive architecture, wherein the first operation occupies a first flash controller corresponding to the first flash drive,
in response to a signal received by a processor, writing, by the processor, data to two or more of the plurality of flash drives, other than the first flash drive, by striping the data amongst the two or more of the plurality of flash drives;
performing a second operation on a second flash drive of the plurality of flash drives, wherein the second operation occupies a second flash controller corresponding to the second flash drive;
refraining from reading a first block of data from the second flash drive in response to a second signal received by the processor;
reading two or more blocks of data from two or more of the plurality of flash drives, other than the second flash drive, in response to the second signal received by the processor; and
reconstructing data from the two or more blocks of data, using parity data, to compensate for not reading the first block of data.

15. The method of claim 14, wherein the first operation comprises at least one of (i) a read operation, (ii) a write operation, (iii) an erase operation, (iv) a wear leveling operation.

16. The method of claim 14, wherein the second operation comprises at least one of (i) a read operation, (ii) a write operation, (iii) an erase operation, (iv) a wear leveling operation.

17. The method of claim 14, wherein the signal comprises one of (i) an interrupt signal, (ii) a data packet or (iii) a strobe signal.

18. The method of claim 14, wherein writing data to two or more of the plurality of flash drives is performed via two or more flash controllers corresponding to the two or more of the plurality of flash drives.

19. The method of claim 14, wherein striping the data comprises writing one or more data blocks of the data to each of the two or more of the plurality of flash drives until the data has been written to the two or more of the plurality of flash drives.

20. The method of claim 14, further comprising:
maintaining a table of state information with respect to the one or more flash controllers.

* * * * *